United States Patent Office 3,267,172
Patented August 16, 1966

3,267,172
TOUGH FLEXIBLE ADHESIVES FROM GUAN-
AMINES, DIGLYCIDYL ETHERS OF POLY-
ALKYLENE GLYCOLS AND DICYANDI-
AMIDE
Heinz B. Arnold, Minneapolis, Minn., assignor to General
Mills, Inc., a corporation of Delaware
No Drawing. Filed Jan. 26, 1962, Ser. No. 169,131
24 Claims. (Cl. 260—830)

The present invention relates to novel compositions of matter comprising certain epoxy resins, fatty guanamines and dicyandiamide. More particularly, it relates to tough, flexible compositions comprising the reaction product of fatty guanamines, diglycidyl ethers of polyalkylene glycols and dicyandiamide. In addition, the basic composition can be modified by replacing a part of the diglycidyl ethers of polyalkylene glycols with an epoxy resin prepared from polyfunctional halohydrins and polyhydric phenols. Such compositions are particularly suitable as adhesives in addition to having utility in other fields such as coatings, sealants, laminates, and the like.

It is a constant goal of manufacturers of metallic containers to find an organic cement which may be used to replace the usual metallic solder in can seams, particularly in such cans which must be heat processed. Such a cement must posses good adhesion to a variety of substrates and have high peel strength. In addition, the cement should be capable of attaining these qualities within a very short elevated temperature cure cycle. For ease of application, the cement should be a one package system with a sufficiently long shelf life at ambient temperatures.

Since most epoxy curing systems are reactive at room temperature at least to some degree and react to produce cured resins when maintained at room temperature for extended periods of time, it is necessary to maintain the epoxy resin and the curing agents separate until it is desired to effect reaction.

"B stage" resins have been successfully prepared from fatty guanamines and epoxies other than those instantly used. However, the fully cured resins prepared therefrom lack the peel strength of the resin blend of this invention. For example, guanamines when reacted with epoxies such as those prepared from Bisphenol A and epichlorohydrin, the glycidyl ethers of tetra (p-hydroxyphenyl)-ethane, the epoxy novolacs, and the epoxy prepared from epichlorohydrin and bis (p-hydroxyphenyl) sulfone yield hard, rigid plastics with little or no peel strength.

However, in my copending application Serial No. 169,133, filed of even date, are disclosed tough, flexible compositions comprising the reaction product of certain guanamines and diglycidyl ethers of polyalkylene glycols with or without epoxy resins prepared from polyfunctional halohydrins and polyhydric phenols. Such compositions can be partially cured or "B staged" to yield one-package curable adhesives which are stable at ambient room temperatures and which cure in reasonable time at high temperatures to provide tough, flexible thermosets which have excellent adhesion to a variety of substrates and exhibit good peel strength. The present invention is based on the unexpected discovery that the inclusion of small amounts of dicyandiamide in the above described compositions dramatically incrases the peel strength of the cured resins and also reduces the cure time thereof. The compositions of the present invention can also be partially cured to provide "B stage" resins.

It is, therefore, an object of this invention to provide a tough, flexible, adhesive composition.

It is also an object of this invention to provide such a composition of certain epoxy resins, fatty guanamines and dicyandiamide.

It is a further object of this invention to provide a partially cured epoxy resin formulation which is stable for extended periods but which is capable of rapid reaction at elevated temperatures.

It is also an object of this invention to provide a partially cured epoxy resin formulation having good stability and which can be finally cured at a rapid rate to produce a cured resin of high peel strength.

Another object of this invention is to provide a cement for the seams of metallic containers. It is also an object of the invention to provide metallic containers having the seams thereof sealed with such cement.

In making metallic containers such as cans the operation is highly mechanized and automatic devices are used which serve to form and shape the parts and to bring the parts together for formation of seams. These devices are mechanically timed and operate at high rates of speed. Successive parts to be joined follow one another at very short intervals. Moreover automatic can-making machines are equipped with thermostatically controlled heaters which heat the adhesive to a specific and limited temperature range at which the adhesive is soft or liquid. It is essential in such operation that the bonding agent at this temperature be sufficiently soft and have suitable viscosity characterics such that it will flow onto the seam portion of the can and such that it will develop adhesive characteristics within a certain limited period of time. It is important that the bonded seams will not fail when the can is subjected to ordinary handling in manufacture, packing and shipping. In addition, the products in the cans should not be effected in any way by the metallic container or the adhesive used. In the case of cans for solvents and oils the adhesive must not be soluble in these materials but should retain its adhesive properties under such circumstances.

The containers sealed with the compositions of the present invention may be made of any metal conveniently used in making containers. Illustrative of the metals which are used are steel, aluminum, copper, bronze, tin plate and the like. As the containers are generally formed of sheet metal, the seams are usually formed of interfolded metal layers. An adhesive is used in the seams to serve to strengthen the mechanical joints formed during can manufacture, thereby yielding a stronger and more rigid container. The adhesive also serves as a sealant to fully contain the ingredients of the container which is impossible of accomplishment by mechanical means alone.

The compositions of the present invention are well suited for applications either as adhesives for interfolded side seams of sheet metal containers or as gasket material for the end seams of sheet metal containers. They may also be used as adhesives for lap seams in containers. Container seams and the method of applying adhesives thereto are illustrated in my prior U.S. Patent 2,994,455. The products are heat stable, tough, resilient and do not tend to be brittle. Thus seams bonded with the products remain intact during the usual conditions of handling both in fabrication of the can as well as in packing of the can and in shipment through the ordinary channels of distribution. Also these cements possess the requisite adhesive and cohesive strength for the above described applications and are relatively inert to alkaline and acidic substances, lubricating oils, and numerous other materials.

As pointed out above, the products of the present invention are comprised of the diglycidyl ethers of polyalkylene glycols which are reacted or partially reacted with certain fatty guanamines and which contain small amounts of dicyandiamide. In some instances, it is desirable to replace a portion of the diglycidyl ethers of polyalkylene glycols with an epoxy resin of a polyfunctional halohydrin and a polyhydric phenol.

The diglycidyl ethers of polyalkylene glycols are readily available commercially and may be represented by the following theoretical, idealized formula:

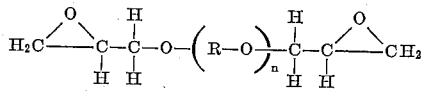

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol and the like. It is further understood that these epoxy compounds, the diglycidyl ethers of polyalkylene glycols, may contain chloromethyl substitutents. These chloromethyl groups would be formed during the polymerization of epichlorohydrin. Also, chloromethyl substituents would be formed if the hydroxy groups resulting from the reaction of epichlorohydrin with the polyalkylene glycol were to react with another molecule of epichlorohydrin.

In general, the diglycidyl ethers are obtained from the well known polyalkylene glycols. Illustrative of the glycols are tetrapropylene glycol and the like corresponding to the general formula:

where R and $n$ have the same values as set forth above with respect to the diglycidyl ether formula. The polyalkylene glycols are reacted with epichlorohydrin to prepare the diglycidyl ethers. A suitable method of preparation is set forth in U.S. Patent No. 2,923,696.

As indicated above, a portion of the diglycidyl ethers of polyalkylene glycols may be replaced by an epoxy resin prepared from polyfunctional halohydrins and polyhydric phenols. These resins are well known and commercially available. Typical phenols useful in the preparation thereof include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxyphenyl)propane (hereinafter referred to as Bisphenol A), the resin having the following theoretical structure formula,

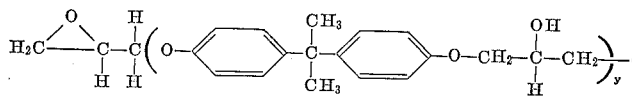

where $y$ is 0 or an integer up to 10. Generally speaking, $y$ will be no greater than 3 or 4 and is preferably 3 or less. These resins may be further characterized by reference to their epoxy equivalent weight which should be in the range of 140–2000 and preferably from 140–600. The epoxy equivalent weight of pure epoxy resins is the mean molecular weight of the resins divided by the mean number of epoxy radicals per molecule, or in any case the number of grams of epoxy resin equivalent to one epoxy group or one gram equivalent of epoxide.

A wide variety of fatty guanamines may be employed in the present invention. They may be represented by the following formulae:

(A) 
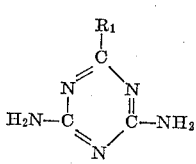

(B) 
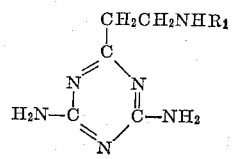

(C) 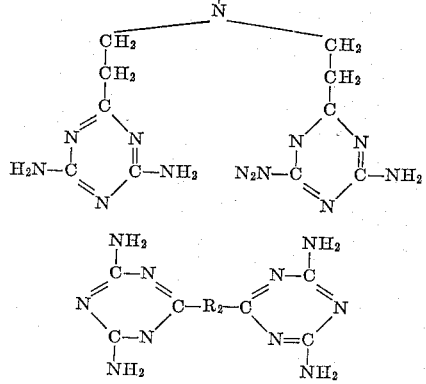

(D) 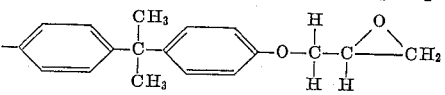

where $R_1$ is an aliphatic hydrocarbon group containing from 4 to about 21, and preferably 6 to 21, carbon atoms and $R_2$ is the hydrocarbon group of dimerized unsaturated fatty acids.

The foregoing guanamine compounds may be defined generally by the following formula: $(A)_xB$ where A is the ring,

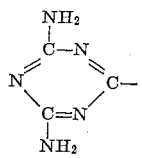

$x$ is an integer of 1 to 2 and B is selected from the group consisting of $R_1$, $R_1NHCH_2CH_2-$, $R_1N(CH_2CH_2-)_2$ and $R_2$ where $R_1$ and $R_2$ have the meanings set forth above.

These guanamines are conveniently made from dicyandiamide and nitriles. Thus the alkyl substituted guanamines may be prepared from alkyl nitriles such as those derived from fatty acids. Compound B may be made from the nitrile, $R_1NHCH_2CH_2CN$, which is the acrylonitrile adduct with the fatty amine $R_1NH_2$. Compound C may be made from the acrylonitrile diadduct of the fatty amine $R_1NH_2$, $R_1N(CH_2CH_2CN)_2$. Compound D may be made from the dinitrile prepared from dimerized fatty acids such as linoleic acid. Thus, the fatty guanamines may be prepared from fatty acids containing from 5 to 22 carbon atoms and the polymerized derivatives thereof by converting the fatty acids to the nitriles and then reacting the nitriles with dicyandiamide. The fatty acid employed may be a single, isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branched chain products having the same number of carbon atoms. The fatty guanamines derived from the $C_8$ to $C_{18}$ acids of coconut oil are referred to as coco-guanamines.

Various methods of preparing the above described fatty guanamines are known in the art. Thus see the following U.S. patents: 2,447,175, 2,459,397, 2,606,904, 2,684,366, 2,777,848, 2,792,395, and 2,900,367.

The guanamine is used in an amount sufficient to cure the epoxy resins. Generally, said guanamines are used in ratios by weight to epoxy resin of from about 5:95 to 75:25 and preferably from about 10:90 to 25:75. It is particularly preferred to use a ratio of 15:85.

The diglycidyl ethers of polyalkylene glycols may be used as the sole epoxy resin in the preparation of the tough, flexible thermosets of the present invention. However, if impact resistance is no object, a portion of said ethers may be replaced by the conventional polyfunctional halohydrin polyhydric phenol type epoxies. In such cases, the ratios by weight of the polyalkylene glycol diglycidyl ether epoxies to the polyhydric phenol halohydrin type epoxies may be from about 20:80 to about 80:20. However, it is preferred to use weight ratios of 25:75 to 75:25. Ratios of 30:70 to 50:50 are particularly preferred.

The dicyandiamide is used in an amount sufficient to improve the peel strength of the cured resin and to shorten the time of cure thereof. Generally, the dicyandiamide is used in amounts of 1 to 10% by weight based on the total weight of the epoxy resin and fatty guanamine. It is preferred to use 2 to 6 percent by weight and particularly preferred to use 4 to 5% by weight.

By "B stage" resin is meant a partially cured product which will undergo little or no physical change during extended storage at ambient room temperatures and in which the reactants are homogeneously compatible in one component, stable compound ready for final cure at elevated temperatures.

A "B stage" resin can generally be described as a partially cured composition which is stable for extended periods of time but is capable of being quickly cured at elevated temperatures. The epoxy-guanamine compositions may be described as proceeding through three stages, A, B, and C.

The "A stage" would be a simple blend or mixture of the epoxy resin, guanamine and dicyandiamide in which essentially no reaction has taken place. Such a simple blend or mixture will be stable for great lengths of time, but may or may not be homogeneous.

The "B stage" is the same resin composition which has been partially reacted or cured and is quite stable at ambient room temperature for extended periods of time. The "B stage" resin can be further reacted at elevated temperatures to yield the fully cured stage, the "C stage," which is an infusible and insoluble polymer.

The "A stage" mixture may, of course, be cured at elevated temperatures to provide an infusible, insoluble polymer. However, longer cure times are required. The use of a "B stage" resin permits rapid cure when required and still provides a stable starting material.

The present invention covers all three stages of the epoxy-guanamine-dicyandiamide compositions. The "A stage" composition is prepared by blending the guanamine, epoxy resin and dicyandiamide. The "B stage" resins are prepared by heating a mixture of the guanamine and epoxy resins to effect partial cure and stopping such curing before the "C stage" is reached. The dicyandiamide is then preferably blended into the "B staged" resin. However, the dicyandiamide may be admixed with the other constituents prior to or during the "B staging" if the partial curing is effected at temperatures below about 160° C. The partial cure of the epoxy resin and guanamine blend containing no dicyandiamide can be effected at various temperatures. At high temperatures, the heating time for producing the "B stage" resin is short and care must be taken that the time is not sufficiently extended so as to result in the "C stage." At low temperatures, the heating period is longer and more control can be exercised. As a practical matter, the epoxy-guanamines employed in this invention will generally be "B staged" at temperatures in the range of 125 to 170° C. Temperatures outside this range may be used, however, although such may present problems. For example, at temperatures above 180° C. the time of heating is so short that it is difficult to prevent advancement of the cure to the "C stage" or finally cured state. At temperatures below 100° C. the time of heating is so prolonged as to be impractical or uneconomical. A common temperature used in practice is about 150° C., at which temperature the heating period is sufficiently long to allow for control over the reaction and yet is not an impractical or uneconomical length of time.

The "B stage" resins can also be prepared by the process described and claimed in the copending application of David S. Chatterton, Serial No. 169,132, filed of even date. According to said process, the "B stage" resins are prepared by reacting a fatty guanamine and epoxy resin in a suitable solvent, such as the Cellosolves, at the temperatures described hereinabove. The reaction or partial curing can be easily controlled by this method since the removal of the heat of reaction is greatly facilitated by the use of a less viscous medium.

As the temperature and period of heating will vary somewhat depending on the particular epoxy resin, the particular guanamine, and the proportions used thereof, some means of indicating when the desired "B stage" resin is obtained had to be devised. It is, of course, most important that the reaction not be carried out to the point where gellation occurs. One means of avoiding gellation, which can be used during the heating period, is the determination of the viscosity of the product. Another is to determine the oxirane oxygen content periodically and observe the rate of change thereof.

In observing the change in viscosity during heating, it will be noted that very little change occurs during the initial heating period. As heating is continued, the rate of change in viscosity begins to increase somewhat and just prior to gellation the viscosity increases very rapidly. When viscosity begins to increase greatly, heating must be discontinued and the product must be cooled quickly before gellation occurs.

In determining oxirane oxygen content, resin samples are withdrawn from the batch periodically, cooled rapidly, and dissolved in acetic acid. The solution is titrated with HBr to the end point (crystal violet). Since HBr titrates both the oxirane oxygen of the epoxy resin and the amine of the guanamine, mercuric acetate solution is added and the solution is titrated to the same end point as before. The difference between the two titrations represents the actual oxirane oxygen content.

In the examples that follow the reaction was stopped short of gellation by observing the increase in viscosity.

Thus the "B stage" resins of the present invention may be prepared by heating the mixture of components at a temperature sufficient to effect partial cure, for example at about 100 to 210° C., and preferably at 140° to 170° C. Thereafter the heating should be discontinued and the reaction mixture should be cooled before final cure occurs so that a "B-staged" resin with the desired properties results. The desired point of termination may be determined by observing the viscosity and oxirane oxygen content. In general, a "B stage" resin will exist when the reaction is from about 5 to 90% complete. As a practical matter the preferred "B stage" resins are those in which the reaction is about 15 to 50% complete, the most desirable being about 25 to 40% complete.

The epoxy-fatty guanamine-dicyandiamide compositions have a threshold curing temperature of near 120° C. but for rapid cure temperatue in excess of 150° C. are preferred. At temperatures below 120° C. the compositions are quite stable for extended periods of time. For example, a "B-staged" epoxy-fatty guanamine-dicyandiamide mixture was held at 130° F. for 10 days, at the end of which time the resin was still mobile and usable.

This property of long shelf life makes possible several useful areas of application for these compositions. There has been a continuing search for "B-staged" epoxy compositions which have a long shelf life and which can be used to formulate molding compounds, sealants, adhesives, potting compounds, and fiber glass laminates. With the present invention it is possible to prepare compositions containing the resins of this invention and have them remain uncured for long periods of time even at temperatures considerably higher than room temperature. At the same these compositions may be cured at temperatures around 150° C., to yield tough, flexible thermosets which have excellent adhesion to a wide variety of substrates and exhibit excellent peel strength. The resins of this invention are particularly useful as cements for the sealing of metallic containers.

The following reactants were used in the preparation of the adhesive formulations in the examples which follow, said examples serving to further illustrate the invention:

*Epoxy Resin A.*—A diglycidyl ether of a polyalkylene glycol of the general formula set forth hereinabove wherein R is propylene and $n$ is about 7. Said resin has an epoxide equivalent weight of about 330 and a viscosity of 88 centipoises at 25° C.

*Epoxy Resin X.*—A condensation product of Bisphenol A and epichlorohydrin having an epoxide equivalent weight of about 190.

*Epoxy Resin Y.*—A condensation product of Bisphenol A and epichlorohydrin having an epoxide equivalent weight of about 525.

$C_{11}$ *Guanamine.*—A guanamine of the general Formula A set forth hereinabove wherein $R_1$ is a $C_{11}$ alkyl group. Said guanamine was prepared from dicyandiamide and a $C_{12}$ nitrile, the latter being derived from the $C_{12}$ fraction of coconut oil acids.

EXAMPLE I

To a mixture of 42.7 parts by weight Epoxy Resin A, 21.3 parts by weight Epoxy Resin Y and 21 parts by weight of Epoxy Resin X was added 15 parts by weight $C_{11}$ Guanamine. The mixture was heated to 150° C. with stirring and held at this temperature until the viscosity of the fluid blend had reached 40 centipoises. At this point the blend was quickly cooled to ambient room temperature.

The peel strength of the tough, flexible thermosets prepared from the "B-staged" resin with and without added dicyandiamide was determined, the results being set forth in Table I. The dicyandiamide was milled into the resin using a three-roll mill. The amount of dicyandiamide (in parts per hundred based on 100 parts of the "B-staged" resin) and peel strengths for the formulations are set forth in Table I. The peel strength was determined by bonding 1 inch wide strips of the indicated metals with the adhesives. The strips were cured in a heated platen press at the temperature and for the periods indicated in the table. Adhesive thickness between the strips was limited to about 3 to 5 mils. The peel strength was measured by using a Dillon Multirange Tester. The uncemented ends of the metal strips were drawn at a rate of one inch per minute saddlewise over a plurality of ½ inch diameter roll guides suspended in a jig which is attached to one end of the tester. The maximum reading in pounds was recorded as the peel strength. Four specimens of each formulation were tested and the average value is that set forth in the table.

*Table I.—Average peel strength in pounds*

| Substrate [1] | Cure time at 375° F., Min. | No. 1 No Dicy.[2] | No. 2 2 p.p.h. Dicy. | No. 3 3 p.p.h. Dicy. | No. 4 4 p.p.h. Dicy. | No. 5 5 p.p.h. Dicy. | No. 6 6 p.p.h. Dicy. |
|---|---|---|---|---|---|---|---|
| Black Plate | 3 | | 47 | 83 | 115 | 148 | 144 |
| Do | 5 | | 106 | 144 | 152 | 165 | 166 |
| Do | 12 | 36 | 156 | 164 | 163 | 143 | 137 |
| Do | 30 | | 164 | 151 | 135 | | |
| Aluminum | 3 | | | | | 109 | 122 |
| Do | 5 | | 87 | 109 | 140 | 149 | 156 |
| Do | 12 | | 125 | 131 | 145 | | |
| Do | 30 | | | | | | |
| Tin Plate | 3 | | | | | 144 | |
| Do | 5 | | | | | 126 | 124 |
| Do | 12 | | 73 | 116 | 117 | 121 | 122 |
| | | | 106 | 104 | 126 | | |

[1] Can makers quality substrate used in all cases.
[2] Dicyandiamide.

The data of Table I indicate clearly the unexpected advantages of including dicyandiamide in the adhesive formulations. Thus in all cases the formulations containing said ingredient have a much faster cure rate and higher peel strength than the base resin. The advantage of short cure time on a can line producing 500 to 600 cans per minute is obvious. Attention is also called to the fact that the adhesives of the present invention (formulations 2–6) display high peel strength on a variety of metal substrates. Furthermore, a resin is produced which has a suitable viscosity, handles very well, can be applied as a bead to a vertical surface and has a long shelf life.

EXAMPLE II

To a mixture of 21.7 parts by weight Epoxy Resin Y, 42.1 parts by weight Epoxy Resin A and 21.2 parts by weight Epoxy Resin X was added 15 parts by weight $C_{11}$ Guanamine. Total resin batch weight was 4500 grams. The blend was heated to 150° C. with stirring and held at this temperature for 85 minutes during which time the viscosity increased from 18 to 54 centipoises as measured at 150° C. The resin blend was then quickly cooled to 70° C. and divided into two equal portions. To one portion was added 4 parts per hundred and to the other 5 parts per hundred of dicyandiamide, said compound being milled into the resin blend on a three roll mill. Peel strength specimens were prepared and tested in the manner described for the adhesives of Example I (see Table I). Additionally, and in order to demonstrate adequate rate of cure when using hot air, peel specimens were also cured in a forced draft oven at 375° C. for a total of 6 minutes. Results of the above tests are set forth in Table II.

*Table II*

| Substrate | Cure time [1] at 375° F., Min. | Average Peel Strength, Lbs. | |
|---|---|---|---|
| | | No. 7 4 p.p.h. Dicy. | No. 8 5 p.p.h. Dicy. |
| Black Plate | 3 | 122 | 153 |
| Do | 5 | 156 | 175 |
| Do | 12 | 168 | 172 |
| Do | 30 | 131 | 130 |
| Aluminum | 3 | 115 | 140 |
| Do | 5 | 151 | 138 |
| Do | 12 | 166 | 134 |
| Tin Plate | 3 | 127 | 135 |
| Do | 5 | 141 | 141 |
| Do | 12 | 107 | 123 |
| | Oven Cure at 375° F., 6 Min. | | |
| Black Plate | | 126 | 141 |
| Aluminum | | 118 | 122 |
| Tin Plate | | 136 | 138 |

[1] Cured in a heated platen press same as Table I.

Tensile shear strength was also determined. One inch wide tensile shear specimens were prepared on 2024 T3 aluminum with a ½ inch overlap and an adhesive thickness of about 1 mil. Four specimens were prepared of each formulation, No. 7 and No. 8 (Table II), and cured for ½ hour in an oven at 375° F. The average tensile shear strength was 2280 p.s.i. and 2340 p.s.i. respectively.

EXAMPLE III

An adhesive formulation was prepared which was identical with that described in Example II (5 parts per hundred dicyandiamide). A one pint sample of this adhesive was stored in a forced draft oven at 130° F. in order to check elevated temperature shelf life. Viscosity was checked periodically as was peel strength on black plate. Peel specimens were prepared and tested in the same manner as the formulations of Examples I and II (the specimens were cured for 5 minutes at 375° F.). The storage results are given in Table III below:

*Table III*

| Lapsed Storage Time (Days) | Viscosity at 130° F. (poises) | Average Peel Strength, Lbs. |
|---|---|---|
| Initial | 126.5 | 155 |
| 1 | 126 | |
| 2 | 155 | |
| 3 | 214 | 177 |
| 6 | 521 | 154 |
| 7 | 674 | |
| 8 | 1,084 | 165 |
| 9 | 2,468 | |
| 10 | 3,230 | |

The above data show that the elevated temperature storage is more than adequate and peel strength remains high. Even after 10 days storage the viscosity is such that the resin can still be considered fluid.

EXAMPLE IV

To a blend of 22 parts by weight Epoxy Resin Y, 42 parts by weight Epoxy Resin A, 21 parts by weight Epoxy Resin X and 15 parts by weight of $C_{11}$ Guanamine was added 5 parts by weight of dicyandiamide. This mixture was passed through a three roll mill and the resulting blend was heated to 150° C. with stirring and held at this temperature for 10 minutes during which time the viscosity at 150° C. increased from 28 to 48 centipoises. The "B-staged" resin was then quickly cooled to 70° C. Peel strength specimens were prepared as explained in Example I and cured 5 minutes at 375° F. The average peel strength on black plate was 142 lbs.

This example shows that outstanding adhesives can be prepared by adding the dicyandiamide to the epoxy resin and fatty guanamine prior to the "B-staging" reaction.

EXAMPLE V

A blend consisting of 80 parts by weight Epoxy Resin A and 20 parts by weight $C_{11}$ Guanamine was heated at 150° C. with stirring for about 6 hours during which period the viscosity increased from 14 to 70 centipoises as measured at 150° C. The reaction product was then cooled to 50° C. and divided into two equal portions. To one portions was added 5 parts by weight dicyandiamide which was dispersed in the resin by passing the mixture through a three roll mill. Forty gram samples of the "B-staged" resin, with and without added dicyandiamide, were gelled by heating in an oven at 375° F. The formulation containing the dicyandiamide gelled in about 17 minutes whereas the resin which contained no dicyandiamide took nearly twice as long to gel, about 30 minutes. This again demonstrates the much more rapid cure of the "B-staged" adhesives containing dicyandiamide.

All of the adhesive compositions in the examples were "B staged." However, it is understood that simple blends of the epoxy resins, fatty guanamines and dicyandiamide can be used since the properties of the fully cured product do not depend on whether a "B stage" resin was first produced or whether the mixture of the epoxy resin, guanamine and dicyandiamide was heated directly to the cured stage (C stage). It is preferred to use "B stage" resins since said resins still have a long usable shelf life and can be cured in a much shorter time than the simple mixture (A stage).

The tough, flexible, compositions of the present invention are particularly useful as adhesives. However, said compositions are not limited to this use. Coatings, laminates, sealants, and the like may also be prepared therefrom. It is also within the scope of the invention to include in said compositions solid modifiers (such as pigments, fillers and treated clays), solvents and other well known addition agents.

It is to be understood that the invention is not to be limited to the exact details of operation or the exact compositions shown and described, as obvious modifications and equivalents will be apparent to those skilled in the art and the invention is to be limited only by the scope of the appended claims.

Now, therefore, I claim:

1. A curable composition of matter comprising (1) a diglycidyl ether of a polyalkylene glycol having the formula:

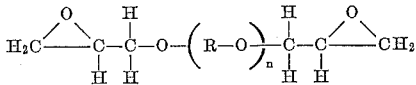

where R is an alkylene radical having from 2–5 carbon atoms and $n$ is an integer of from about 1 to about 50, (2) a fatty guanamine having the formula: $(A)_xB$ where A is the ring,

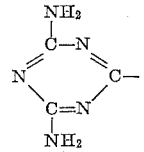

$x$ is an integer of 1 to 2 and B is selected from the group consisting of $R_1$, $R_1NHCH_2CH_2$—, $R_1N(CH_2CH_2$—$)_2$ and $R_2$ where $R_1$ is an aliphatic hydrocarbon group containing from 4 to 21 carbon atoms and $R_2$ is the hydrocarbon group of dimerized unsaturated fatty acids of from 5 to 22 carbon atoms and (3) 1 to 10% by weight dicyandiamide based on the total weight of the diglycidyl ether and fatty guanamine.

2. The composition of claim 1 wherein B is $R_1$ and $x$ is 1.

3. The composition of claim 2 wherein $R_1$ is an aliphatic hydrocarbon group of 11 carbon atoms.

4. The composition of claim 1 wherein R is propylene and $n$ is an integer of from about 3 to about 10.

5. The composition of claim 1 wherein a portion of the diglycidyl ether (1) is replaced by (4) a polyglycidyl ether of a polyhydric phenol having an epoxy equivalent weight of 140–2000, the weight ratio of (1) to (4) being in the range of about 80:20 to 20:80.

6. A curable composition stable for extended periods of time at ambient room temperatures comprising (1) a diglycidyl ether of a polyalkylene glycol having the formula:

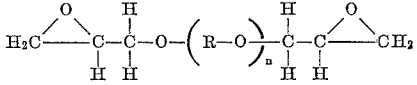

where R is an alkylene radical having from 2–5 carbon atoms and $n$ is an integer of from about 1 to about 50, (2) a fatty guanamine having the formula: $(A)_xB$ where A is the ring,

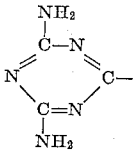

$x$ is an integer of 1 to 2 and B is selected from the group consisting of $R_1$, $R_1NHCH_2CH_2-$, $R_1N(CH_2CH_2-)_2$ and $R_2$ where $R_1$ is an aliphatic hydrocarbon group containing from 4 to 21 carbon atoms and $R_2$ is the hydrocarbon group of dimerized unsaturated fatty acids of from 5 to 22 carbon atoms and (3) 1 to 10% by weight dicyandiamide based on the total weight of the diglycidyl ether and fatty guanamine, said composition being 5 to 90% cured.

7. The composition of claim 6 wherein B is $R_1$ and $x$ is 1.

8. The composition of claim 7 wherein $R_1$ is an aliphatic hydrocarbon group of 11 carbon atoms.

9. The composition of claim 6 wherein R is propylene and $n$ is an integer of from about 3 to about 10.

10. The composition of claim 6 in which the partial curing is from 15 to 50%.

11. The composition of claim 6 wherein a portion of the diglycidyl ether (1) is replaced by (4) a polyglycidyl ether of a polyhydric phenol having an epoxy equivalent weight of 140–2000, the weight ratio of (1) to (4) being in the range of about 80:20 to 20:80.

12. A cured composition of matter comprising (1) a diglycidyl ether of a polyalkylene glycol having the formula:

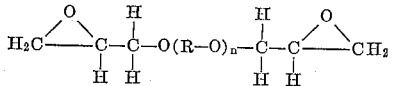

where R is an alkylene radical having from 2–5 carbon atoms and $n$ is an integer of from about 1 to about 50, (2) a fatty guanamine having the formula: $(A)_xB$ where A is the ring,

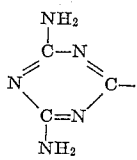

$x$ is an integer of 1 to 2 and B is selected from the group consisting of $R_1$, $R_1NHCH_2CH_2-$, $R_1N(CH_2CH_2-)_2$ and $R_2$ where $R_1$ is an aliphatic hydrocarbon group containing from 4 to 21 carbon atoms and $R_2$ is the hydrocarbon group of dimerized unsaturated fatty acids of from 5 to 22 carbon atoms and (3) 1 to 10% by weight dicyandiamide based on the total weight of the diglycidyl ether and fatty guanamine.

13. The composition of claim 12 wherein B is $R_1$ and $x$ is 1.

14. The composition of claim 13 wherein $R_1$ is an aliphatic hydrocarbon group of 11 carbon atoms.

15. The composition of claim 12 wherein R is propylene and $n$ is an integer of from about 3 to about 10.

16. The composition of claim 12 wherein a portion of the diglycidyl ether (1) is replaced by (4) a polyglycidyl ether of a polyhydric phenol having an epoxy equivalent weight of 140–2000, the weight ratio of (1) to (4) being in the range of about 80:20 to 20:80.

17. A metallic container having seams, said seams being bonded by the composition of claim 12.

18. A metallic container having seams, said seams being bonded by the composition of claim 14.

19. A metallic container having seams, said seams being bonded by the composition of claim 15.

20. A metallic container having seams, said seams being bonded by the composition of claim 16.

21. A process of producing a heat curable composition stable for extended periods of time at room temperature comprising reacting, at a temperature sufficient to effect partial curing, (1) a diglycidyl ether of a polyalkylene glycol having the formula:

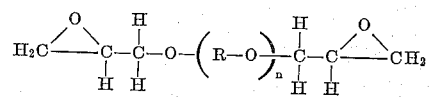

where R is an alkylene radical having from 2–5 carbon atoms and $n$ is an integer of from about 1 to about 50, (2) a fatty guanamine having the formula: $(A)_xB$ where A is the ring,

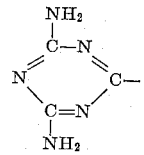

$x$ is an integer of 1 to 2 and B is selected from the group consisting of $R_1$, $R_1NHCH_2CH_2-$, $R_1N(CH_2CH_2-)_2$ and $R_2$ where $R_1$ is an aliphatic hydrocarbon group containing from 4 to 21 carbon atoms and $R_2$ is the hydrocarbon group of dimerized unsaturated fatty acids of from 5 to 22 carbon atoms, and (3) 1 to 10% by weight dicyandiamide based on the total weight of the diglycidyl ether and fatty guanamine and terminating said reaction when 5 to 90% complete.

22. A process as defined in claim 21 in which said reaction is terminated when 15 to 50% complete.

23. A process as defined in claim 21 in which said fatty guanamine (2) and said ether (1) are employed in a weight ratio of about 5:95 to 75:25.

24. A process as defined in claim 21 in which a portion of the diglycidyl ether (1) is replaced by (4) a polyglycidyl ether of a polyhydric phenol having an epoxy equivalent weight of 140–2000, the weight ratio of (1) to (4) being in the range of about 80:20 to 20:80.

References Cited by the Examiner

UNITED STATES PATENTS

| | | | |
|---|---|---|---|
| 2,447,175 | 8/1948 | Grun | 260—249.9 |
| 2,447,177 | 8/1948 | Grun | 260—249.9 |
| 2,512,996 | 6/1950 | Bixler | 260—2 |
| 2,801,229 | 7/1957 | De Hoff et al. | 260—2 |
| 2,900,367 | 8/1959 | Suen et al. | 260—67.6 |
| 2,994,455 | 8/1961 | Arnold. | |

FOREIGN PATENTS 133,819   8/1949   Australia.

MURRAY TILLMAN, *Primary Examiner.*

LEON J. BERCOVITZ, *Examiner.*

E. J. TROJNAR, P. LIEBERMAN,
*Assistant Examiners.*